United States Patent [19]

Kübler

[11] 4,433,234

[45] Feb. 21, 1984

[54] MECHANICAL PRESELECTION COUNTER

[75] Inventor: Fritz Kübler, VS-Schwenningen, Fed. Rep. of Germany

[73] Assignee: Ing. Fritz Kübler, Zählerfabrik GmbH, Schwenningen, Fed. Rep. of Germany

[21] Appl. No.: 363,507

[22] Filed: Mar. 30, 1982

[30] Foreign Application Priority Data

Mar. 31, 1981 [DE] Fed. Rep. of Germany ....... 3112678

[51] Int. Cl.[3] ............................................ G06F 15/18

[52] U.S. Cl. ............................ 235/132 E; 235/144 R

[58] Field of Search ........... 235/132 R, 132 A, 132 E, 235/144 R, 144 M, 144 HC, 117 A, 109, 144 ME, 144 MG, 133 A

[56] References Cited

U.S. PATENT DOCUMENTS

| | | | |
|---|---|---|---|
| 3,022,942 | 2/1962 | Van Veen | 235/117 A |
| 3,977,599 | 8/1976 | Bud et al. | 235/144 HC |
| 4,277,677 | 7/1981 | Neher | 235/132 E X |

*Primary Examiner*—Benjamin R. Fuller

*Attorney, Agent, or Firm*—Becker & Becker, Inc.

[57] ABSTRACT

A mechanical preselection counter having: a counter, which has figure rollers and a zero-setting device for the figure rollers; a preselection unit having that number of preselection rollers and transmission of feed gears corresponding to the number of figure rollers, with the transmission gears being drivingly or operatively connected with the figure rollers; and with setting or adjustment elements associated with each preselection roller for setting or adjusting them, the adjustment elements being held in the rest position by spring force, being connected via a coupling device with the zero-setting device of the counter, and being operable with actuating elements. The preselection unit is provided with keying devices, each of which has at least two axially protruding noses which project through openings in the associated transmission gear, are respectively associated with a recess on the preselection rollers, and are loaded or biased by a releasing rack toward the preselection rollers. The two noses of the keying device, as well as the two recesses, are respectively spaced from each other in such a way that the noses, during a complete rotation of the transmission gear, only fall or drop in one position into the associated recesses of the preselection roller.

21 Claims, 12 Drawing Figures

MECHANICAL PRESELECTION COUNTER

The present invention relates to a mechanical preset or preselection counter or register having: a counter, which has figure or cipher rollers and a zero-setting device for the figure rollers; a preselection unit having that number of preselection rollers and transmission or feed gears corresponding to the number of figure rollers, with the transmission gears being drivingly or operatively connected with the figure rollers; and with setting or adjustment elements associated with each preselection roller for setting or adjusting them, the adjustment elements being held in the rest position by spring force, being connected with the zero-setting device of the counter via a coupling device, and being operable with actuating elements.

It is an object of the present invention basically to construct such a preselection counter in such a way that upon reaching the pulse numeral set with the preselection rollers, a reliable switching-off of the preselection counter is achieved.

This object, and other objects and advantages of the present invention, will appear more clearly from the following specification in connection with the accompanying drawings, in which.

Figure 1:
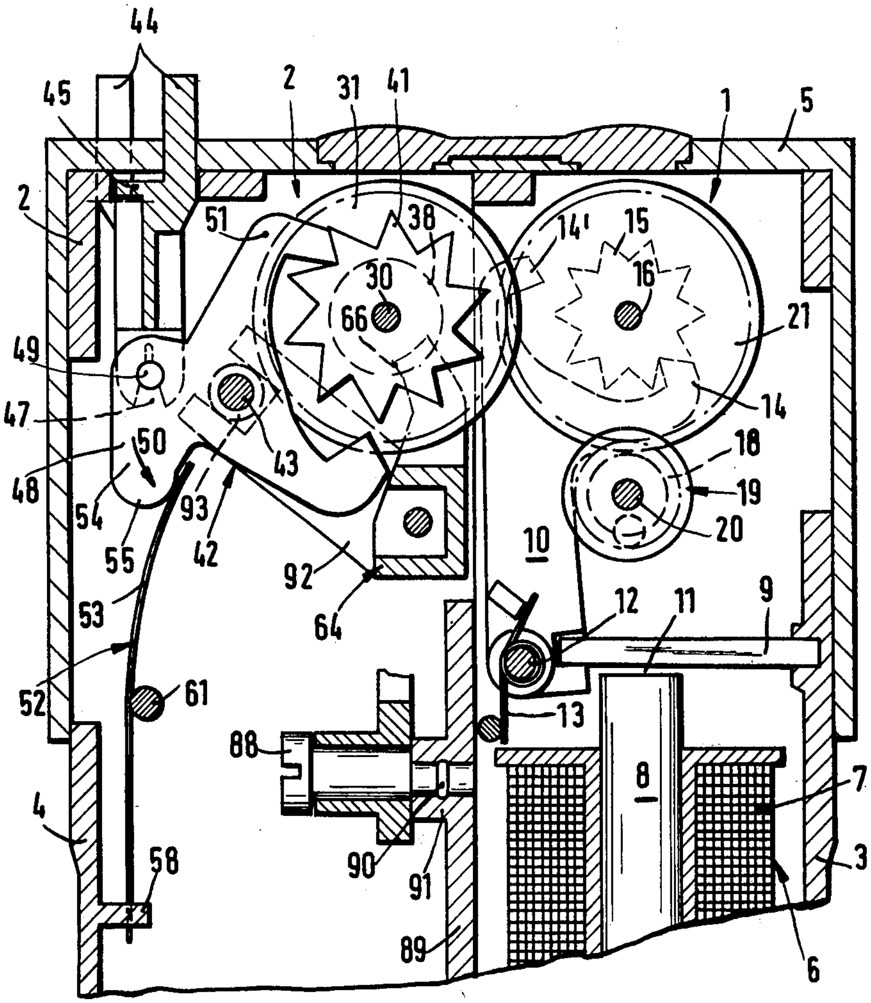
FIG. 1 is a partially sectioned, fragmentary side view of a portion of the inventive preselection counter with the counter and the preselection unit.

The preselection counter of the present invention is characterized primarily in that the preselection unit is provided with keying devices, each of which has at least two axially projecting noses which project through openings in the associated transmission gear, which are respectively associated with a recess on the preselection rollers, and which are loaded or biased by a releasing rack toward the preselection rollers; and in that the two noses of the keying device, as well as the two recesses, are respectively spaced from each other in such a way that the noses, during a complete rotation of the transmission gear, fall or drop only in one position into the associated recesses of the preselection roller.

The two axially projecting noses support the keying device in such a manner on the preselection roller, that the tilting moment exerted on the keying device by the finger of the releasing rack is very slight in every rotational position of the keying device. The two noses form a two-point support of the keying device on the preselection roller, so that a tilting of the keying device relative to the transmission or feed gear, or the preselection roller, is prevented. Consequently, the keying device can be rotated easily relative to the preselection roller. Additionally, there is assured thereby that the keying device can be shifted axially via the releasing rack in an easy motion in such a way that the noses can drop or fall into the associated recesses of the preselection roller. The spacing between the two noses, as well as between the two recesses of the preselection roller, is such that the noses can fall or drop into the recesses of the preselection roller in only one position during a complete rotation of the transmission or feed gear, or of the preselection roller, i.e. at a rotational angle of 360°. This prevents that, for example after only a half rotation of the keying device and of the transmission or feed gear, the noses come into the recesses of the preselection roller. When the electrical pulses enter the electromagnet, the figure or cipher rollers and the transmission or feed gears are driven. The associated keying device is likewise taken along, since its noses project through the openings of the transmission gear. As soon as the figure or numeral set on the preselection roller agrees or coincides with the figure or numeral of the associated figure roller, the noses of the keying device are opposite the recesses of the associated preselection roller. When the counter or computer has reached the preset figure or numeral, the noses of all of the keying devices are opposite the recesses of the preselection rollers. The keying devices are then shifted by the releasing rack toward the preselection rollers, so that the noses can engage in the recesses of all of the preselection rollers.

According to specific features of the present invention, the two noses, and the two recesses, can have the same spacing from the axis of rotation of the preselection rollers. The angular spacing of the two noses from each other may be slightly less than 180°.

The two noses may be provided on the edge of a flange of the keying device. The two noses may taper in a direction toward their free ends.

The releasing rack may have fingers which engage or contact the keying device; and these fingers, near the free end thereof, may have an approximately semi-circular depression in which a hub of the keying device may be supported over substantially half its circumference. The finger may engage the flange of the keying device in the region of the depression.

The recesses may be provided in a cylindrical mantle or sleeve of the preselection roller, and may extend as far as to an end face of the cylindrical sleeve.

The two noses and the recesses may also have different radial spacing from the axis of rotation of the keying device or of the preselection roller. The two noses may be located exactly diametrically opposite each other, and have different radial spacing from the axis of rotation of the preselection rollers.

The keying devices may be mounted or journalled on hubs of the transmission or feed gears. The transmission or feed gears may in turn be mounted or journalled on hubs of the associated preselection rollers, and may be rotatable with respect thereto.

The releasing rack may be spring biased or loaded by a releasing lever which cooperates with a switch contact. The releasing rack may have a stop which extends substantially transverse to the axis of the preselection rollers, and on which a spring tongue of the releasing lever engages. The switch contact may be closed in the contact position of the releasing lever on the releasing rack. The spring tongue may be engaged or supported, in the contact position, on a stop or abutment of the releasing lever, which stop is preferably formed by an arm of the releasing lever. The spring tongue of the releasing lever, under the force of a switch tongue of the switch contact, may engage the stop of the releasing rack.

The releasing lever may be connected with the zero-setting device in such a manner that upon actuation of the zero-setting device, the releasing lever can be shifted counter to the force of the switch tongue of the switch contact into its contact position with the releasing rack.

The releasing lever and the spring tongue may be made in one piece, and the releasing lever may be a plate-like part molded from synthetic material.

The releasing lever may be mounted or journalled on an eccentric for setting or adjusting its position with respect to the releasing rack.

Referring now to the drawings in detail, the preselection or preset computer or counter is an additive counter, which is stepwise electromechanically driven by switching pulses, whereby a counting pulse corresponds to one counting unit. In place of the electromagnetic drive, a purely mechanical drive via a mechanical lifting movement or a rotating shaft can also be provided. The counter or register 1 and the preselection unit 2 are respectively installed in a housing 3,4 which is covered by a common cover 5. An electromagnet 6 with a coil or winding 7 and an iron core 8 is installed or accommodated in the housing 3 of the counter 1. One end of an armature lamination or armature core disc 9 is pivotally mounted or journalled in the wall of the housing 3, while its other end engages in a switch armature 10. The armature core disc 9 lies opposite to the iron core 8 and forms an air gap 11. The switch armature 10 is pivotally mounted on a shaft 12 near a wall of the housing 3, and is loaded or biased by a spring clip 13 to keep it in the rest position illustrated in FIG. 1. The switch armature 10 has two pawls 14, 14', which are intended to engage or mesh in an indexing gear or ratchet 15 on a shaft 16. The shaft 16 is mounted or journalled in housing walls located opposite to each other. The ratchet wheel 15 is positively or non-rotatably connected (unitary in the embodiment of FIG. 5) with an intermediate gear 17, which meshes or engages in a gear 18 of an indexing drive 19. The indexing or shift drive 19 comprises several gears arranged adjacent to each other and seated on a common shaft 20; these gears are arranged below the shaft 16 (FIG. 1).

Figure 1A:
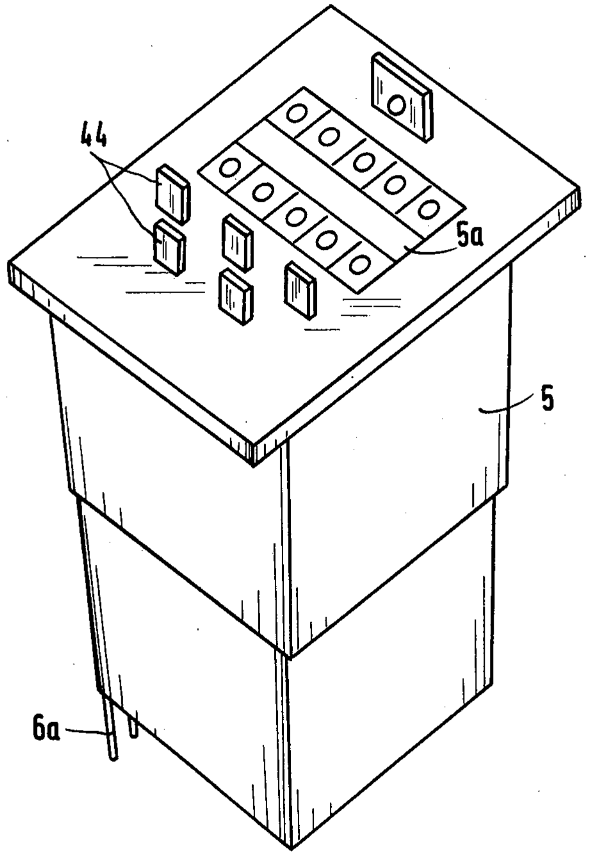
FIG. 1A is a perspective illustration of the preselection counter of the present invention.
Figure 5:
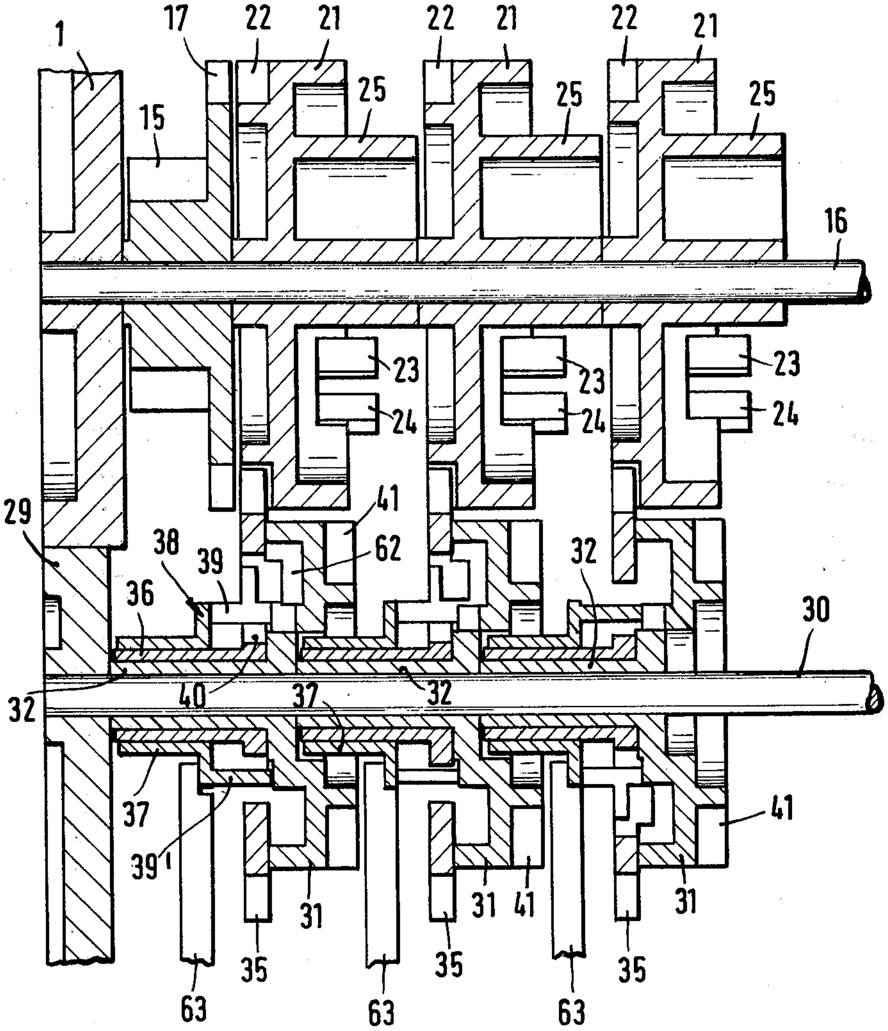
FIG. 5 is a partially sectioned, fragmentary plan view of a portion of the inventive preselection counter with counter and preselection unit.

The number of gears 18 corresponds to the number of counters or figure or cipher rollers 21 on the shaft 16 (FIGS. 1 and 5). Adjacent figure rollers lie against each other, and on that side thereof facing the ratchet 15 respectively have a gear 22 having the same outer diameter as the intermediate gear 17 of the ratchet 15. Each figure roller 21 on its periphery has the numerals zero to nine. In the illustrated embodiment, five figure rollers 21 are arranged on the shaft 16; these rollers respectively correspond to a tens decade. The figure rollers 21 are rotatably seated on the shaft 16. Each figure roller 21 is provided on its circumference or periphery with axially protruding cams or noses 23, 24, as shown in FIG. 5; these noses are provided on that side of each figure roller which faces away from the ratchet 15. When the numeral 9 of the associated figure roller 21 appears in a window *5a* (FIG. 1A) of the cover 5, the noses 23, 24 come into engagement or mesh with the gear 18 of the indexing drive 19 of the adjoining figure roller 21, so that the adjoining figure roller is advanced or rotated ahead by one step or unit. After each renewed complete rotation of the figure roller, the noses 23, 24 engage or mesh with the gear 18 of the adjoining figure roller, which is then respectively advanced ahead by one step.

The electromagnet 6 is provided with terminals *6a*, with which the preselection computer or counter can be electrically connected to a device. As soon as the electromagnet 6 is actuated, the armature core disc 9 is attracted by the iron core 8, whereby the armature core disc 9 executes a corresponding pivot movement toward the iron core 8. The switch armature 10 is thereby pivoted counter to the force of the spring clip 13 toward the ratchet 15, which with the intermediate gear 17 is then advanced ahead by one step. As a consequence of the engagement or meshing of intermediate gear 17 in the associated gear 18 of the indexing or shift drive 19, the gear 18 is also advanced ahead in conformity therewith. The gear 22 of the adjoining figure roller 21 also engages or meshes in this gear 18, with said figure roller 21, together with the gear 22, being seated freely rotatable on the shaft 16. The figure roller 21 non-rotatably connected with the gear 22 is also advanced or shifted further thereby, whereby the next numeral of the figure roller appears in the window of the cover 5. After a complete rotation of each figure roller 21, the noses 23, 24 engage or mesh in the gear 18 of the adjoining figure roller, whereby as a consequence of the meshing of the gear 22 associated with this figure roller in this gear 18, the gear is advanced by one step. In this way, all of the figure rollers can be rotated stepwise as a function of the switching pulses released from the electromagnet 6. Directly after each switching pulse, and after the stepwise advance of the ratchet 15, the switch armature 10, under the force of the spring clip 13, returns to its starting position as illustrated in FIG. 1.

Figure 2:
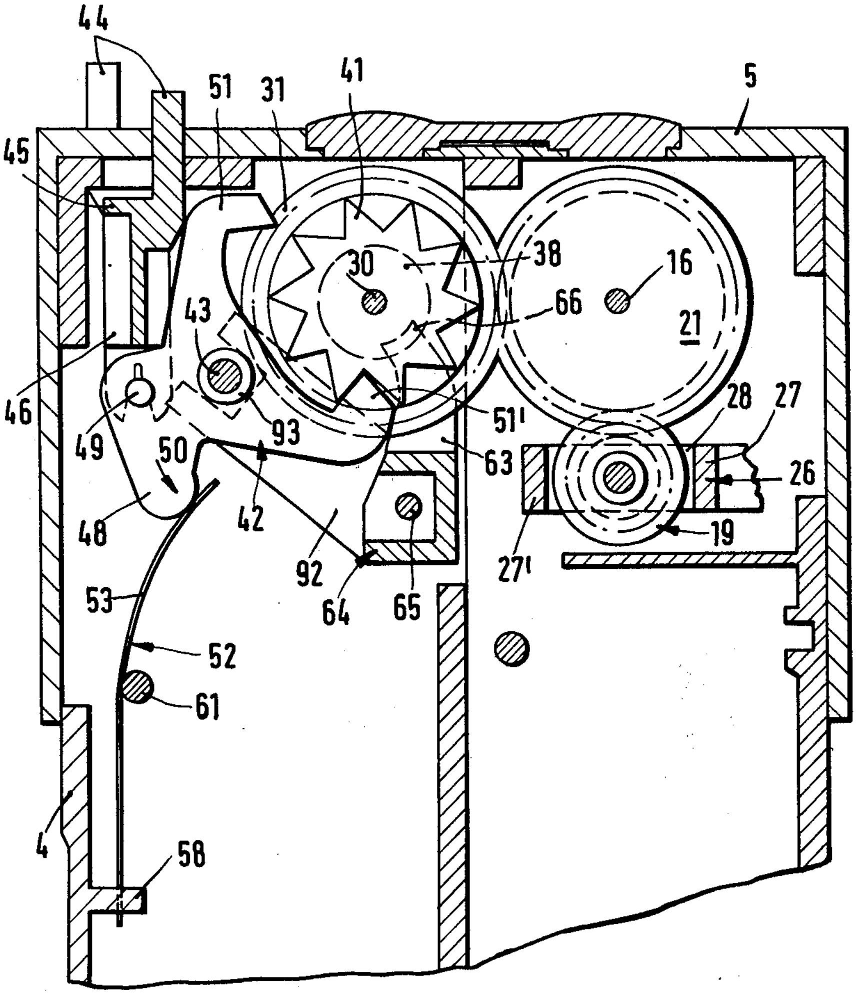
FIG. 2 is a partially sectioned, fragmentary view of a further portion of the inventive preselection counter with counter and preselection device.
Figure 8:
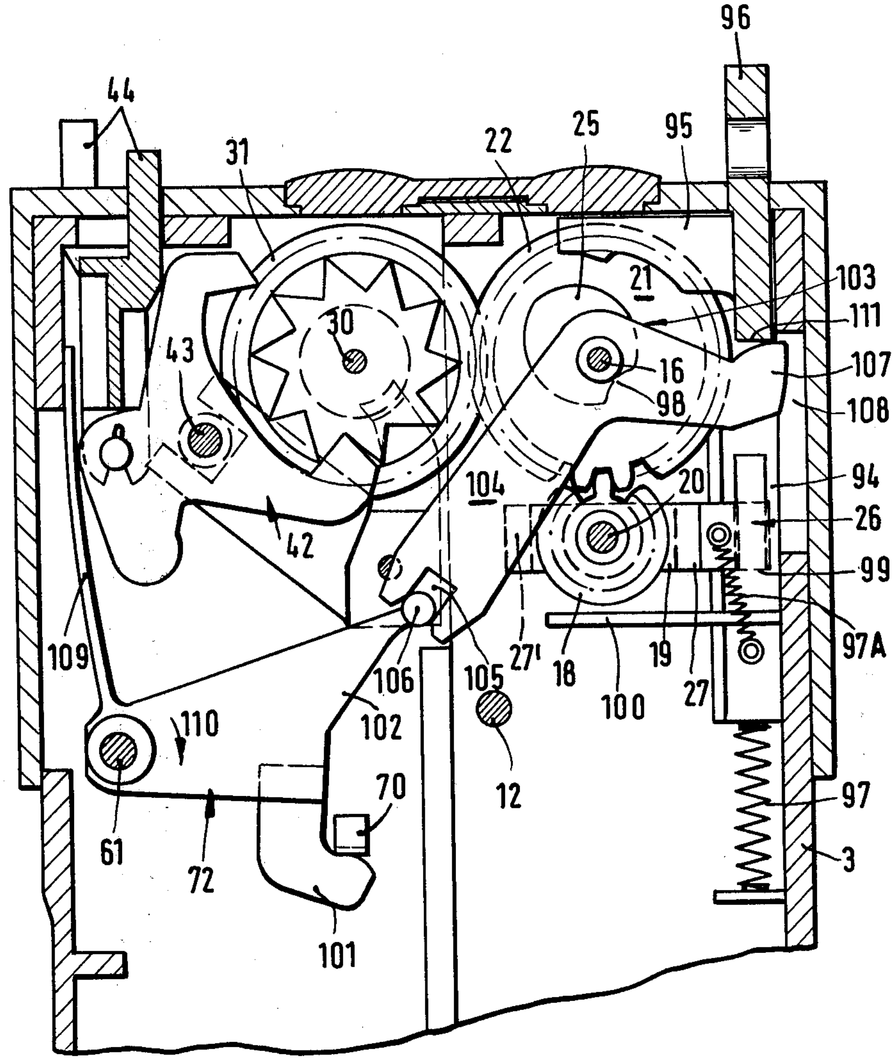
FIG. 8 is a partially sectioned, fragmentary side view of a portion of the inventive preselection counter with the counter and preselection unit as well as a zero-setting or adjustment device in the rest position.
Figure 9:
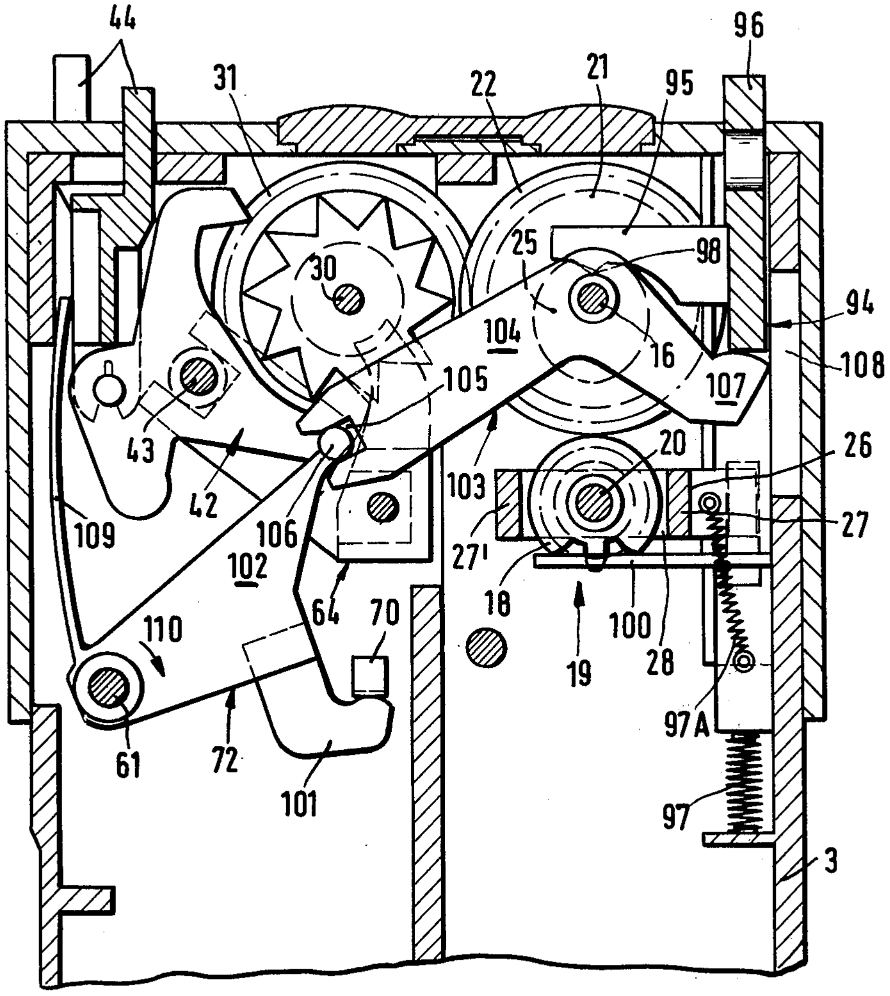
FIG. 9 is an illustration corresponding to that of FIG. 8, though with the zero-setting device depressed.

So that the figure rollers 21 can be returned or rotated back again to the "zero" position, a zero-setting or adjustment device 94 is provided which is mounted on the housing 3 so as to be shiftable transverse to the shaft 16 (FIGS. 8 and 9). This zero-setting device 94 has fingers 95 which engage between adjoining figure rollers 21. When the device 94 is depressed, the fingers 95 come into contact with the heart curves or cardioids 25 on the figure rollers (FIG. 5). The cardioids 25 are provided on that side of the figure rollers facing away from the gear 22, and advantageously are constructed unitarily or integrally therewith. When the device 94 is depressed, the shift drive 19 is also shifted from the shaft 16 so far toward the electromagnet 6 that the gears 18 disengage or come out of mesh with respect to the gears 22 of the figure rollers 21 (FIG. 9), so that the figure rollers can be turned or rotated freely about the shaft 16. The shaft 20 of the indexing drive 19 is fastened or secured in a drive frame 26, the two longitudinal frame parts 27, 27' as well as a transverse frame part 28 of which are illustrated in FIGS. 2, 8 and 9. The drive frame 26 is connected with the zero-setting device 94 (FIGS. 8 and 9) in such a way as to be shiftable in a relative limited or restricted manner, and is biased or loaded under the force of a tension spring 97A, which presses the drive frame 26 against a stop or abutment 99 on the zero-setting device 94 (FIG. 8). The zero-setting device 94 has a release or trip arm 96, which extends outwardly through the cover 5, and with which the zero-setting device 94 and the drive frame 26 connected therewith can be shifted against the force of a spring 97 into the disengaged or out-of-mesh position (FIG. 9). When the zero-setting device 94 is depressed, the drive frame 26 is also shifted downwardly by the tension spring 97A, until the gears 18 come into engagement with stop or abutment fingers 100 fixed to the housing. In this position, the gears 18 are disengaged or out of mesh with the figure rollers 21, so that these can now be rotated freely on the shaft 16. During shifting, the fingers 95 of the zero-setting device 94 come to the cardioids 25 of the figure rollers, whereby the figure rollers, during further depressing of the zero-setting device, are turned or rotated about the shaft 16 in such a manner that the fingers 95 can drop or fall into a recess 98 of the cardioid 25. By means of the recesses, which are respectively located at the same place on the cardioid 25, all of the figure rollers 21 are turned or rotated into their zero position, in which position the numeral "0" appears upon every figure roller and in the cover window. When during depression of the zero-setting device 94, the gears 18 of the drive frame 26 have come into engagement against the stop or abutment fingers 100, the fingers 95 of the zero-setting device are not yet in engagement with the cardioids 25. The fingers 95 only then come into the engagement position during further depression of the zero-setting device, whereby the zero setting device is shifted relative to the drive frame 26. The spring 97A, which is linked to the zero-setting device 94, is thereby stressed. The zero-setting device 94 is returned to its starting position by the spring 97 after release of the release arm 96. As soon as the stop 99 of the zero-setting device 94 strikes against the drive frame 26, this drive frame 26 is likewise taken along, so that the gears 18 of the shift or indexing drive 19 again engage or mesh in the gears 22 of the figure rollers 21.

Figure 3:
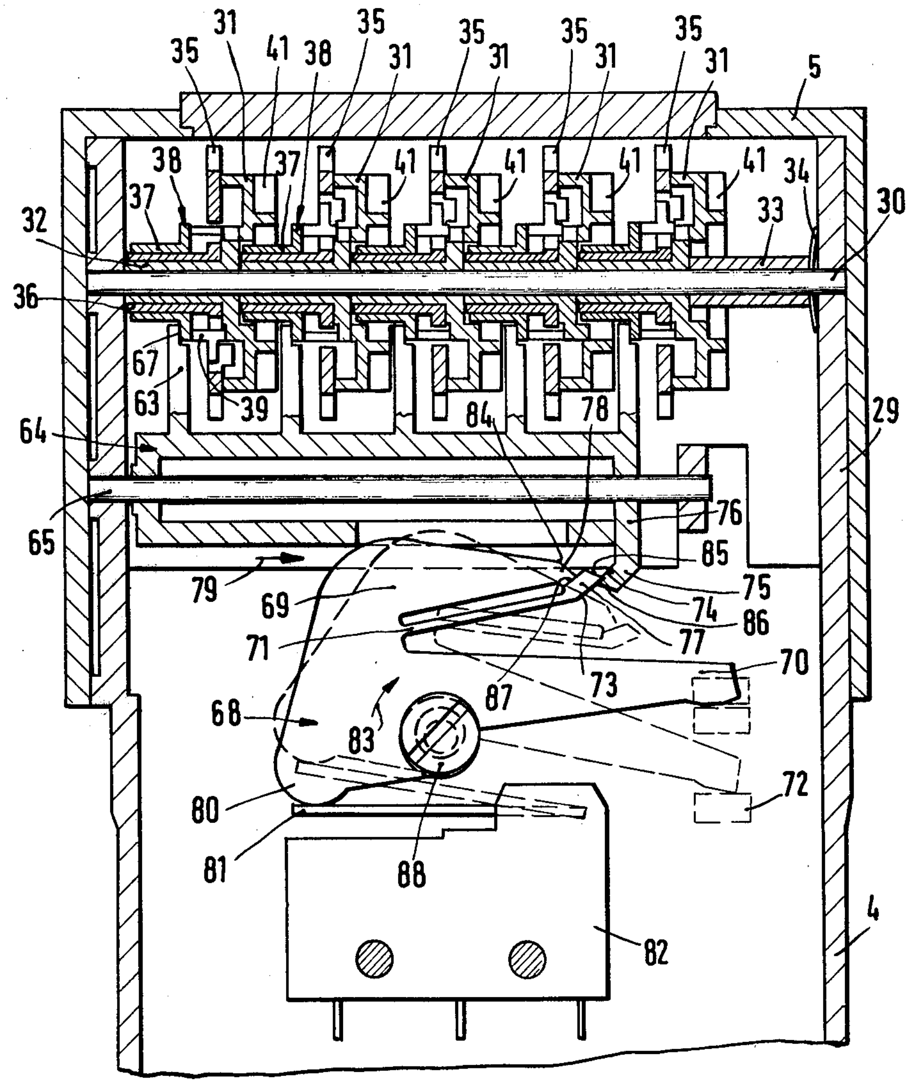
FIG. 3 is a partially sectioned, fragmentary view of the preselection counter of the present invention.
Figure 10:
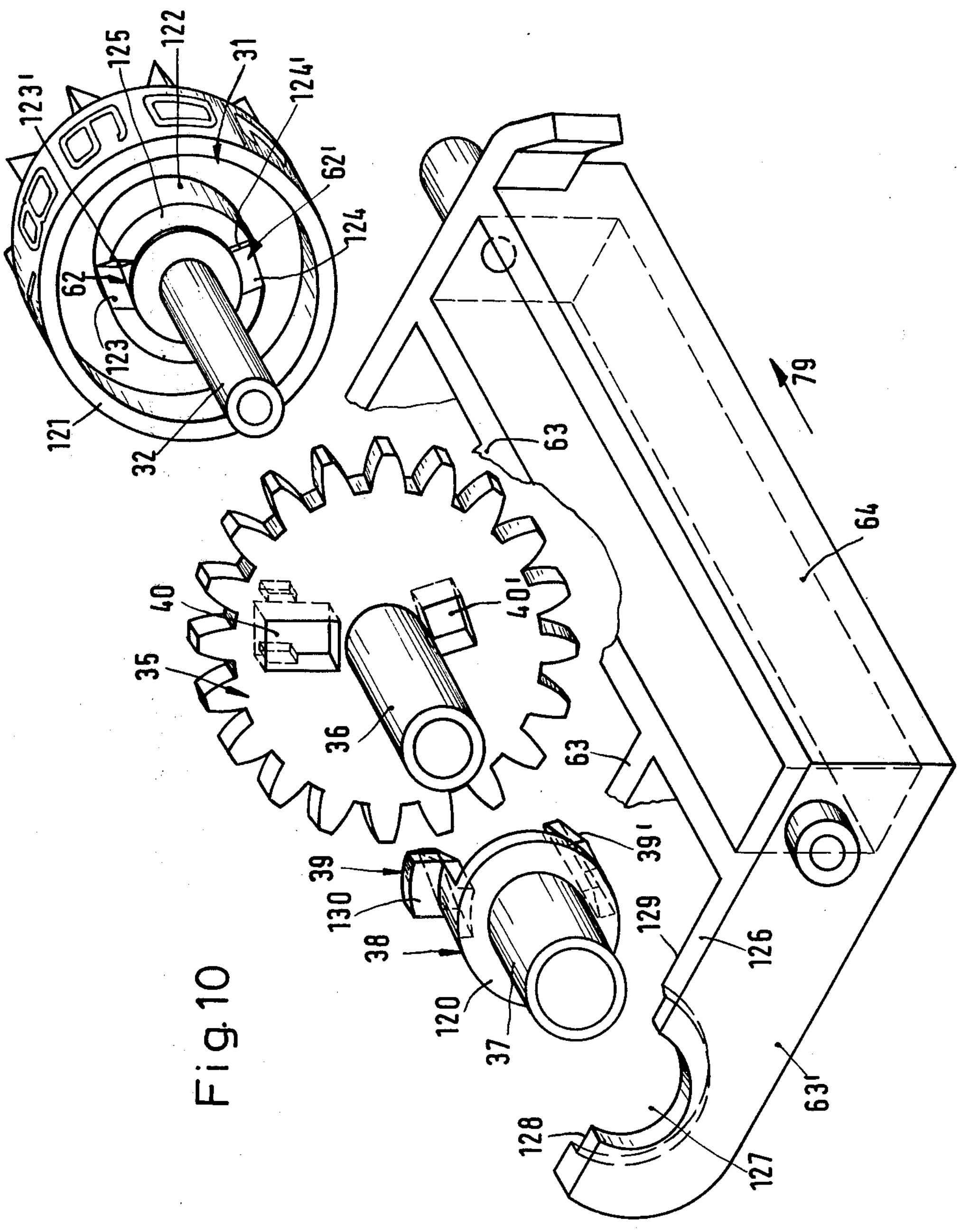
FIG. 10 is an enlarged exploded view of the tripping or releasing rack, the keying device, the transmission or feed gear, and the preselection roller.

The housing 4 of the preselection or preset unit 2 has a frame 29 (FIGS. 3 and 5) which comprises two walls located across from each other in which a shaft 30 of the preselection unit 2 is mounted. As shown in FIG. 10, preselection rollers 31 are seated on the shaft 30 and have a mantle or sleeve 121 which extends along the edge and is provided with the numerals 0 through 9. The hubs 32 of the preselection rollers 31 are rotatably seated on the shaft 30. The hubs 32 extend from the preselection roller toward the adjoining preselection roller, against which the hubs engage. The preselection roller 31 at the right in FIG. 3 is secured axially by an intermediate tubular piece 33 which is seated on the shaft 30. A spring washer or plate spring 34, which presses all of the preselection rollers against each other via the intermediate tubular piece 33, is seated or mounted on the shaft 30, so that the preselection rollers 31 lie close or tightly against each other, with the hub 32 of the preselection roller at the left in FIG. 3 supported against the inner side of the oppositely located frame wall. A transmission or feed gear 35 is rotatably mounted or seated with a hub 36 on the hub 32 of each preselection roller 31; the transmission gear 35 has the same diameter as the gear 22 of the figure roller 21, and is in mesh or engagement therewith, as shown in FIG. 5. The transmission ratio or gear ratio is 1:1 between the two gears 22, 35.

Figure 7:
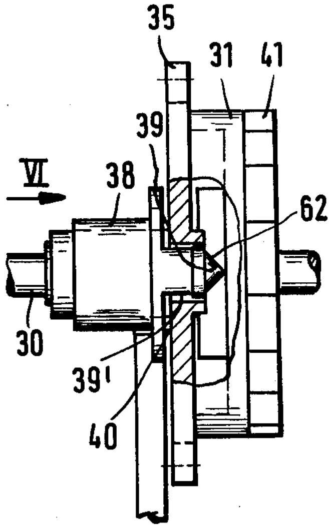
FIG. 7 is a partially sectioned, fragmentary view taken in the direction of arrow VII in FIG. 6 showing the preselection roller with a push button or keying device.
Figure 6:
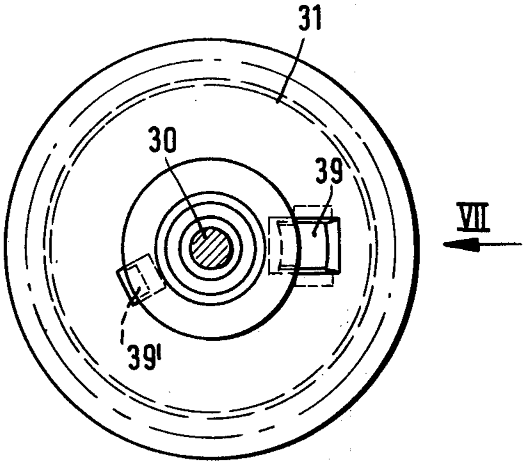
FIG. 6 is a view of a preselection roller of the preselection unit taken in the direction of arrow VI in FIG. 7.

A keying device 38, which is mounted or journalled axially shiftable on the hub 36, is seated on each hub 36 of the transmission or feed gears 35 with a hub 37 which at one end has a flange 120 (FIG. 10). Two axially protruding noses 39, 39', which engage through two openings 40,40' in the transmission or feed gears 35 (see FIGS. 3,5 and 7), extend from the edge of the flange 120 remote from the hub 37. The keying device 38 is thereby rigidly or non-rotatably connected with the transmission gear 35, and can be rotated together therewith on the hub 32 relative to the associated preselection roller 31.

Each preselection roller 31 is provided on that side thereof facing away from the transmission or feed gear 35 with a gear ring or spur gear 41, which can be constructed unitary with the preselection roller. An adjustment or control element 42 respectively engages in the spur gear 41 of each preselection roller 31, as shown in FIGS. 1 and 2. This adjustment element 42 is constructed as a dual-arm switch armature. All of the adjustment elements 42 are pivotably mounted or seated on a common shaft 43 which is arranged below the two shafts 16, 30, which are arranged at the same height.

Figure 4:
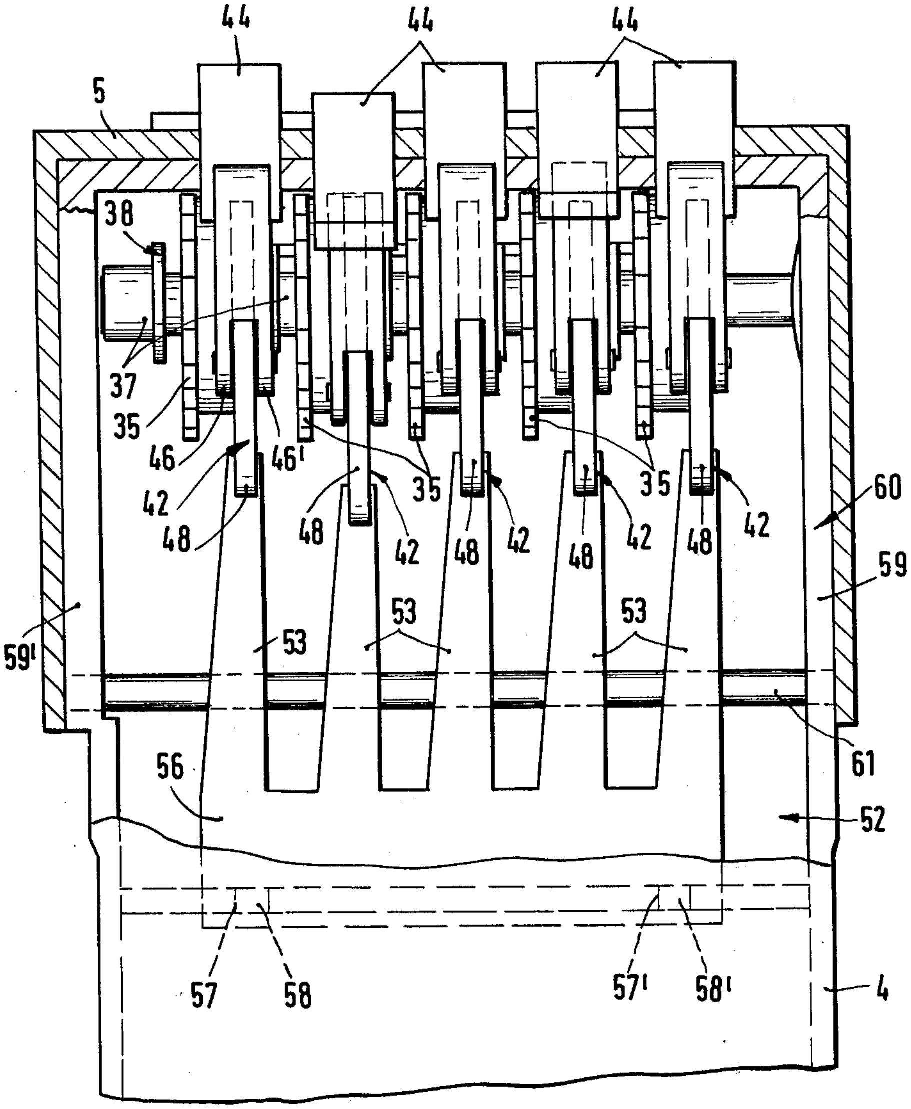
FIG. 4 is a rear view of a preselection unit of the inventive preselection counter.

An actuating element 44 in the form of a push button or key is associated with each preselection roller for stepwise shifting or switching of the preselection rollers 31 (see FIGS. 1, 2 and 4). Each push button projects through corresponding openings in the cover 5. Each actuating element 44 has a transversely arranged stop or abutment 45 (FIGS. 1 and 2) in order to prevent the actuating element from falling out. The actuating element is provided with two legs 46, 46' (FIG. 4) which at their free ends have a receiving slot 47 (FIG. 1). A lever arm 48 of the switch armature 42 is located between the two legs 46, 46'. Pins 49 project from both sides of this lever arm 48; these pins 49 engage in the receiving slot 47 of the two legs 46, 46'. By pressing the actuating element 44, the adjustment element 42 under consideration is pivoted in the direction 50 about the shaft 43, whereby the switch armature 42, with two pawls 51, 51' which engage in the spur gear 41, advance or further rotate the preselection roller 31 by one numeral. With the actuating elements, the individual preselection rollers 31 can be set or adjusted independently of each other to a respectively desired numeral.

Each adjustment element 42 is biased under the force of a spring 52 which tries to pivot the adjustment element 42 counter to the pivot direction 50, or counter to the pressing direction of the push buttons 44. The spring 52 is a strip or comb spring which has that number of spring fingers 53 which correspond to the number of actuating elements 42 (FIG. 4). These spring fingers engage on the lever arm 48 of the adjustment element 42 on that side opposite the actuating element 44 (FIG. 1). For this purpose, the lever arm 48 has an extension projecting toward the spring 52; that side 55 of the extension facing the spring finger 53 is convexly curved. A tilting of the adjustment element 42 during pivoting is thus prevented with certainty. Furthermore, the friction between the extension 54 and the spring finger 53 is kept small as a result of this configuration, so that the push buttons 44 can be easily pressed. The utilization of a single comb spring 52 for all of the adjustment elements 42 represents a considerable manufacturing or production advantage from a technical standpoint, since this single spring 52 can be produced very simply by stamping in one operation. The assembly of the preselection counter is also considerably simplified, because only a single spring 52 has to be installed for all of the adjustment elements.

The spring fingers 53 are constructed so as to taper toward the lever arm 48 of the adjustment element 43 (FIG. 4), whereby the spring effect of the comb spring 52 is improved. The spring fingers 53 merge with a holding part 56 which extends over the entire width of the comb spring 52 and has two openings 57, 57′. Two inwardly projecting pins 58, 58′ are provided on the inner wall of the housing 4; the comb spring 52 can be inserted thereon. The assembly of the comb spring is likewise considerably simplified by this simple insertion procedure. In order to obtain a high spring effect in a structurally simple manner, a shaft 61 is mounted or journalled in two oppositely located walls 59,59′ of a frame 60 adjoining the housing 4, as shown in FIG. 4. This shaft 61 engages against that side of the spring finger 53 which faces away from the cover wall. The adjustment elements 42 are constructed and assembled in such a way that the spring fingers engage with a resilient or elastic bending against the extension 54 (FIG. 1), with the shaft 61 forming an abutment or support for the spring fingers 53.

The mantle or sleeve 121, of the preselection roller 31, which supports the numerals, surrounds and is spaced from a further cylindrical mantle or sleeve 122, which coaxially surrounds the hub 32. Two recesses or notches 62, 62′ are provided in the cylindrical sleeve 122; these recesses extend or protrude from that edge of the cylindrical sleeve facing the transmission or feed gear 35 (FIG. 10). The noses 39, 39′ can engage these recesses during a predetermined relative positioning between keying device 38 and preselection roller 31. This is the case for example when the preselection roller 31 has the numerical setting "0". The keying devices 38 are pressed with a light pressure against the side surfaces of the preselection rollers 31 by the fingers 63 of a releasing or triggering rack 64. The releasing rack 64 is displaceably mounted on a shaft 65 which is securely arranged in the housing (FIG. 3). The fingers 63 have an end piece 66 which is angled off at an incline toward the keying device 38, as shown in FIGS. 1 and 2; the end face of the piece 66 has a step or offset 67 (FIG. 3), into which the keying device 38 engages.

The spring tension exerted upon the releasing rack 64 is produced by a releasing lever 68 which is pivotally mounted on one housing wall (FIG. 3). The releasing lever 68 has two arms 69 and 70, of which the arm 69 is constructed as a support for a spring tongue 71, and the other arm 70 is positively connected with a cocking lever 72. The cocking lever 72 is seated on the shaft 61 next to the housing wall, and has an arm 101 upon which the arm 70 of the releasing lever 68 rests, as shown in FIGS. 8 and 9. A further arm 102 of the cocking lever 72 is connected with a coupling piece 103 which is constructed as a two-arm lever and is pivotally mounted on the shaft 16. The one arm 104 of the coupling piece 103 at its free end has a slot 105 into which the arm 102 of the cocking lever 72 engages with a guide pin 106 having a circular cross section. The other arm 107 of the coupling piece 103 engages with its free end in an opening 108 of the zero-setting device 94. The cocking lever 72 is biased under the force of a spring 109, which advantageously is constructed unitarily or integrally with the cocking lever 72, and with its free end is supported under elastic or resilient preloading against the housing wall. The cocking lever 72 is expediently a synthetic material part, so that it can be produced simply and inexpensively. The spring 109 presses the cocking lever 72 in the direction 110 in such a manner that the coupling piece 103 is pivoted upwardly, so that its arm 107 engages the upper wall 111 of the slot 108 in the zero-setting device 94.

In the striking or engagement position illustrated by the solid line in FIG. 3, a striking surface 73 of the spring tongue 71 engages a counter striking surface 74 of a stop 75 of the releasing rack 64. The stop 75 is formed by the lower end of a downwardly directed extension 76 of the releasing rack 64, and is angled off toward the releasing lever 68. The spring tongue 71 is made integral with the releasing lever 68, so that the entire releasing lever, including the spring tongue, can be made or produced simply and economically in a single operation. The striking surface 73 of the spring tongue 71 is provided at a thickened end piece 77 of the spring tongue, which end piece 77 is angled off toward the releasing rack 64. The arm 69 has an extension 78 which is angled off toward the end piece 77, and on the end face of which the end piece 77 engages in the striking position.

In the striking position according to FIG. 3, the spring tongue 71 with the end piece 77 engages with elastic deformation against the stop 75 of the releasing rack 64 and exerts a force thereon effective in the direction 79. The keying devices 38 are thereby also pressed in the same direction against the associated preselection rollers 31 via the fingers 63 of the releasing rack.

The releasing lever 68 has a projection 80 which engages a switch or shift tongue 81 of a microswitch 82. The switch tongue 81 is pressed downwardly in the striking position of FIG. 3, so that no switch contact can occur.

In the sample embodiment, any five-digit number can be set with the preselection rollers 31 of the preselection unit 2 via the push buttons 44, which are arranged displaced or offset relative to each other for easier setting. Every time the push buttons are pressed, the preselection roller 31 under consideration is advanced by one unit beginning from 0. The transmission or feed gears 35, and the keying discs or devices 38 remain in position during this keying procedure.

The two noses 39, 39′ of the keying device 38 are tapered in a direction toward their free ends, and have a wedge shape in the sample embodiment. The angular spacing of the two noses 39, 39′, and hence the angular spacing between the openings 40, 40′ of the transmission or feed gears 35 and the recesses 62, 62′ of the preselection rollers 31, is less, preferably only slightly less, than 180°, as shown in FIG. 10. This assures that during a complete rotation of the transmission or feed gear or of the keying device, the two noses can drop in only a single position in the associated recesses of the preselection roller. The noses 39, 39′ of the keying device 38 can only engage in these recesses in a predetermined relative position between the keying device and the preselection roller. This is the situation for example when the preselection roller 31 has the numerical setting "0". In this relative position both noses engage positively in both recesses of the preselection roller. The recesses 62,

62' also have a wedge shape corresponding to the wedge shape of the noses. The two wedge surfaces 123, 123' and 124, 124' of the two recesses adjoin the end face 125 of the cylindrical sleeve 122. With such an arrangement of the wedge surfaces, the noses 39, 39' are pressed out of the recesses 62, 62' during a relative rotation of the preselection roller 31 relative to the keying device 38, whereby the keying device 38 is displaced or pushed away axially from the preselection roller 31, so that the free ends of the noses come to the end face 125 of the cylindrical sleeve 122.

Since the two noses 39, 39' have an angular spacing of preferably only slightly less than 180° from each other, the keying device 38 is supported at substantially diametrically opposite locations on the preselection roller 31, whereby a high security against tilting of the keying device 38 on the hub 36 of the transmission or feed gear 35 is attained.

With the embodiment illustrated in FIG. 10, the fingers 63' of the releasing rack 64, near their free ends, have a nearly semi-circular depression 127 in their narrow sides 126. The hub 37 of the keying device 38 lies in this depression 127, with the flange 120 of the device 38 engaging a shoulder surface 128 on that side 129 of the finger 63' facing the keying device.

The finger 63' surrounds the hub 37 over approximately half of its circumference because of the semi-circular construction of the depression 127. The finger 63 additionally engages with the shoulder surface 128 over nearly half of the circumference of the flange 120.

If electrical pulses now enter the electromagnet 6, the figure rollers 21 are driven stepwise via the ratchet 15 as previously described. Since the gears 22 of the figure rollers 21 mesh or engage with the transmission or feed gears 35 of the preselection unit 2, the transmission or feed gears are turned or rotated to the same extent as the figure rollers. The keying device 38 associated therewith is hereby also taken along, with the noses 39, 39' of the device 38 engaging through the openings 40, 40' in the transmission or feed gear 35. As soon as the numeral which is set on each preselection roller 31 coincides with the numeral of the figure roller 21, the noses 39, 39' of the keying device 38 lie opposite the recesses 62, 62' of the associated preselection roller. When the computer or counter 1 has reached the preset number, the noses 39,39' of all of the keying devices 38 lie opposite the recesses 62, 62' of the preselection rollers 31. Then the releasing rack 64, which is under the force of the releasing lever 68, can, with its fingers 63, 63', shift the keying devices 38 on the hubs 36 of the transmission or feed gears 35 in the direction toward the preselection rollers 31, so that the noses 39, 39' can engage the recesses 62, 62'. The releasing rack 64 is thereby shifted by the releasing lever 68 in the direction 79. The force necessary for pivoting the releasing lever 68 is produced by the switch tongue 81, which under tension engages the projection 80 of the releasing lever, biasing the latter in the direction 83. As soon as the releasing rack 64 can be shifted, the switch tongue 81 pivots the releasing lever 68 in the direction 83, whereby the releasing rack 64 is shifted in the direction 79. The releasing rack 64 then assumes the position represented by dash-lines in FIG. 3. A switch contact from the microswitch 82 is hereby released or triggered. The switch tongue 81 remains in its releasing or triggering position even when further pulses arrive at or enter the counter 1.

The tilting moments exerted by the fingers 63, 63' of the releasing rack 64 are kept very small as a consequence of the dual or two-point support or engagement of the keying device 38 via the two noses 39, 39', so that the keying device 38 with its hub 37 cannot tilt on the hub 36 of the transmission or feed gear 35. The keying device 38 can thereby be easily rotated with respect to the associated preselection roller 31. Additionally, the keying device can thereby be shifted easily on the hub 36 of the transmission or feed gear 35 for engagement of the noses 39, 39' in the recesses 62, 62'. The tilting danger, and the considerable reduction of the tilting moment exerted upon the keying device, are still further improved thereby that with the embodiment according to FIG. 10, as a consequence of the approximately semi-circular depression 127, the fingers 63' of the releasing rack 64 surround the hub 37 of the keying device 38 substantially over half the circumference thereof, whereby a relatively uniform loading of the keying device 38 is attained by the finger 63', and thereby the danger of tilting is greatly reduced. A relative rotation of the preselection roller 31 with respect to the keying device 38 and the transmission or feed gear 35 is sufficient to bring the noses 39, 39' out of engagement with the recesses 62, 62' of the preselection roller 31. As a consequence of the wedge surfaces of the recesses and the noses, these noses are pushed out of the recesses, whereby the keying device is displaced or pushed away axially from the preselection roller until the free nose ends lie upon the end face 125 of the cylindrical sleeve 122. The outer side of the nose 39 has a piece 130 projecting at right angles therefrom and extending parallel to the flange 120; the piece 130 extends over the entire width of the nose 39, and in the engagement position of the noses with the recesses of the preselection roller, engages the end face 125 of the cylindrical sleeve 122.

The keying device can also be provided with three or more noses in place of two noses. In that case, the transmission or feed gear 35 and the preselection roller 31 are provided with a corresponding number of openings and recesses. The noses have unequal spacing from each other so that also with such a keying device configuration, during a complete rotation of the preselection roller, the noses can engage in the recesses in only a single position.

Figure 11:
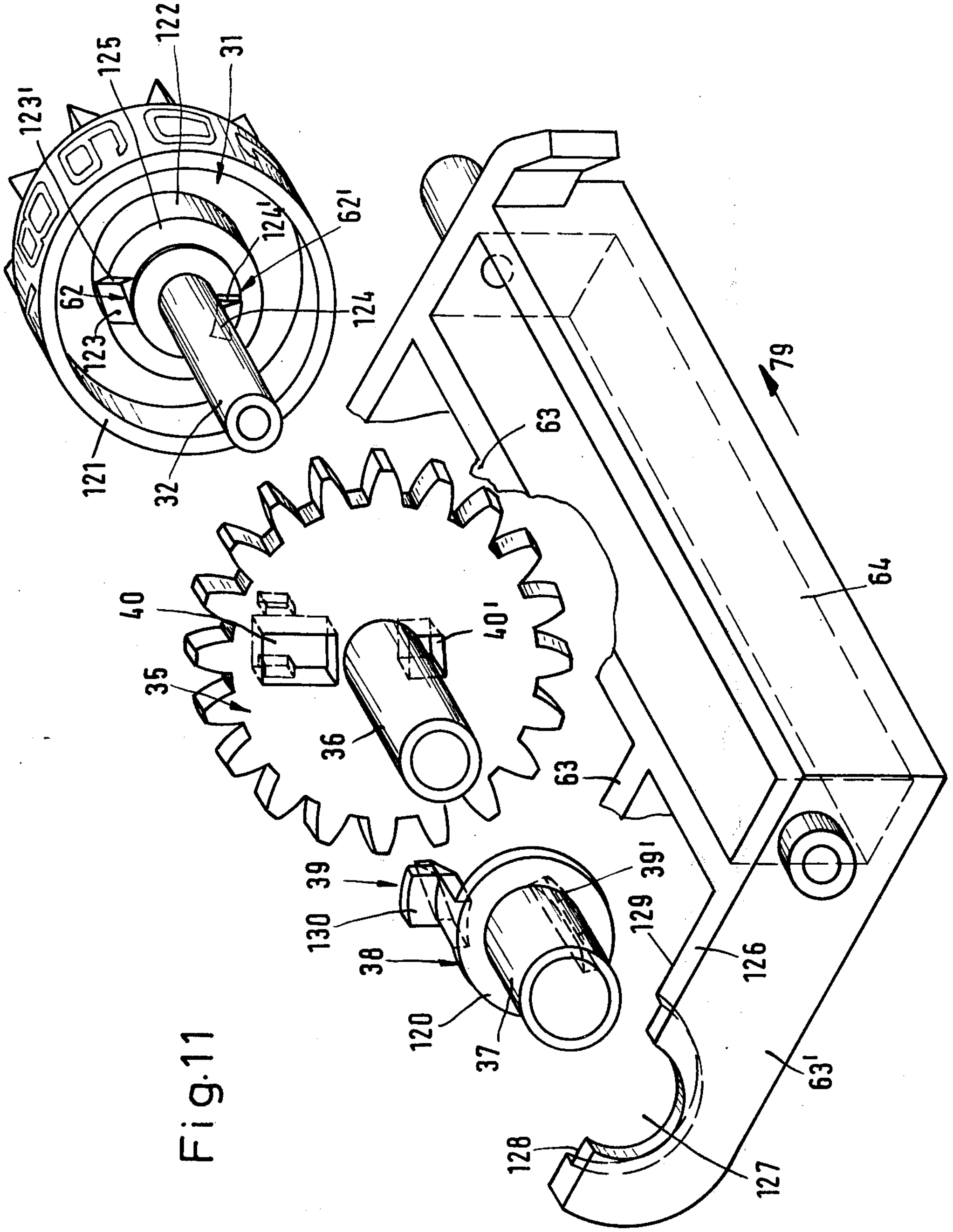
FIG. 11 is another exploded view similar to FIG. 10 showing a second embodiment of the keying device, the transmission or feed gear, and the preselection roller.

It is also possible to arrange both noses 39, 39' exactly diametrically opposite to or across from each other, as shown in FIG. 11. However, the noses and the recesses have different radial spacing from the axis of rotation of the keying device 38 or the preselection roller 31, so that the noses can drop or engage in the recesses 62, 62' of the preselection roller 31 only after a complete rotation of the transmission or feed gear 35. The keying device 38 is securely supported by the diametrically oppositely located noses, so that the keying device cannot tilt on the hub 36 of the transmission gear 35 as a result of the force exerted by the finger 63.

The cocking lever 72 is pivoted via the arm 70 in the direction 110 during pivoting of the releasing lever 68 in the direction 83, whereby the coupling piece 103, which is at right angles to the zero-setting device 94, is pivoted upwardly until its arm 107 engages the counter surface 111 of the zero-setting device 94. This position of the parts including the cocking lever 72 and the coupling piece 103, which are at right angles to the zero-setting device 94, can be found illustrated in FIG. 8.

The keying devices 38 are returned to their starting position on the hubs 36 of the transmission or feed gears during turning-out of the noses 39, 39' from the recesses 62, 62' of the preselection roller 31. The releasing rack 64 is hereby also pushed back into its starting position via the fingers 63 counter to the shifting direction 79. The figure rollers 21 are subsequently turned back or returned to their zero position by means of the zero-setting device 94, as previously described. The arm 107 of the coupling piece 103 is again pivoted downwardly via the counter surface 111 during depression of the zero-setting device 94, so that the coupling piece 103, via its other arm 104, pivots the cocking lever 72 counter to the pivot direction 110 and against the force of the spring 109. The arm 70 of the releasing lever 68 is thereby pivoted upwardly by the arm 101 of the cocking lever 72.

That side 74 of the extension 78 facing the stop 75 of the releasing rack 64 extends at an incline in such a manner that the arm 70 can be pivoted past the stop 75 without engaging it. The spread or widened end piece 77 of the spring tongue 71 extends beyond the extension 78, and its end face 85 comes into contact or engagement during pivoting back against the correspondingly inclined end face 86 of the stop 75. The spring tongue 71 is thereby first held back under the effect of elastic deformation, while the arm 69 pivots past the stop 75. The spring tongue 71 snaps back against the contact or engagement surface 87 on the extension 78 only after traveling an appropriate distance past the releasing lever 68. The switch tongue 81 pivots back into its starting position during pivoting back of the releasing lever 68, and now presses the releasing lever 68 against the extension 75.

The releasing lever 68 can now no longer pivot in the direction 83. The cocking lever 72 and the coupling piece 103 are connected with each other in a manner of a knee or elbow joint (FIG. 9) in such a way that they cannot pivot automatically out of this position into the position of FIG. 8. Not until the arm 70, during pivoting of the releasing lever 68, is pivoted downwardly, can they be pivoted into the position illustrated in FIG. 8. So that the releasing lever 68 is satisfactorily released during shifting of the releasing rack 64, the end piece 77 of the spring tongue 71 engages or contacts the counter abutment or stop surface 74 over only a relatively short length, so that already a short shifting path of the releasing rack 64 suffices to release the releasing lever 68 and to achieve a switch contact of the microswitch 82.

The releasing lever 68 is especially simple to produce out of synthetic material in a single operation as a consequence of the unitary or integral construction with the spring tongue 71, and can be installed in the preselection counter easily and without great cost. The releasing rack 64 is pressed reliably with its fingers 63 against the keying devices 38 as a consequence of the spring tongue 71, so that upon reaching the previously set numeral, the keying devices 38 can drop immediately into the corresponding recesses 62, 62' of the preselection roller 31.

In order to set or adjust the releasing lever 68 with respect to the stop 75 of the releasing rack 64, the releasing lever 68 is seated or mounted on an eccentric screw 88, which is mounted in the wall 89 of the housing 4 by means of a toroid or torus 90 so as to be axially unshiftable though rotatable. The eccentric screw 88 is seated with force fit in a shoulder 91 of the wall 89 (FIG. 1).

The releasing rack 64 has arms 92 engaging between the adjusting elements 42 (FIGS. 1 and 2), with the free ends of the arms 92 being slotted in such a way that they surround sleeves 93 located on the shaft 43 between the adjustment elements 42. The releasing rack 64 is thereby accurately guided during its axial shifting.

A transparent synthetic material hood or cover can be removably placed over the cover 5 to protect the actuating elements 44 and/or the release arm 96 of the zero-setting device 94 against unintended actuation thereof.

The present invention is, of course, in no way restricted to the specific disclosure of the specification and drawings, but also encompasses any modifications within the scope of the appended claims.

What I claim is:

1. A mechanical preselection counter, comprising:
- a counter provided with figure rollers and a zero-setting device for said figure rollers including means for operative relationship therebetween;
- a preselection unit provided with preselection rollers and transmission gears, with the number of said preselection rollers and said transmission gears respectively corresponding to the number of said figure rollers; said transmission gears being operatively connected with said figure rollers and being respectively provided with at least two openings;
- an adjustment element associated with each preselection roller for adjusting the latter, said adjustment elements being held in the rest position by spring force;
- a coupling device for connecting said adjustment elements with said zero-setting device;
- actuating elements for operating said adjustment elements;
- keying devices respectively associated with said transmission gears and said preselection rollers, each keying device having at least two axially projecting noses adapted to project through said openings of an associated transmission gear, with said preselection rollers being provided with recesses respectively coordinated with said openings of said transmission gears; and
- a releasing rack for loading said keying devices toward said preselection rollers; with the noses of a given keying device being spaced from one another, as well as with the recesses of a given preselection roller being spaced from one another, in such a way that said noses, during a complete rotation of the associated transmission gear, drop into the recesses of an associated preselection roller in only one position.

2. A mechanical preselection counter according to claim 1, in which the noses of a given keying device, and the recesses of a given preselection roller, have the same spacing from the axis of rotation of said preselection roller.

3. A mechanical preselection counter according to claim 2, in which the spacing of two noses from each other on a given keying device is slightly less than 180°.

4. A mechanical preselection counter according to claim 3, in which each keying device is provided with a radially extending flange, with the noses being provided on the edge of said flange.

5. A mechanical preselection counter according to claim 4, in which said noses of said keying devices taper in a direction toward their free ends.

6. A mechanical preselection counter according to claim 5, in which each keying device is provided with a hub and in which said releasing rack is provided with fingers which engage said keying device, said fingers having one end connected to said releasing rack, and in the vicinity of the other end thereof have an approximately semi-circular depression in which approximately half of the circumference of said hub of said keying device is supported.

7. A mechanical preselection counter according to claim 6, in which said finger of said releasing rack engages said flange of said keying device in the region of said depression.

8. A mechanical preselection counter according to claim 7, in which each preselection roller is provided with a cylindrical sleeve, and in which said recesses of a given preselection roller are provided in said cylindrical sleeve and extend to an end face thereof.

9. A mechanical preselection counter according to claim 1, in which the noses of a given keying device, and the recesses of a given preselection roller, have different radial spacing from the axis of rotation of their associated keying device and preselection roller.

10. A mechanical preselection counter according to claim 9, in which the noses of a given keying device are located exactly diametrically opposite one another and have different radial spacing from the axis of rotation of said preselection roller.

11. A mechanical preselection counter according to claim 1, in which said transmission gears are respectively provided with hubs, with said keying devices being respectively mounted on said hubs.

12. A mechanical preselection counter according to claim 11, in which said preselection rollers are respectively provided with hubs, with said transmission gears being respectively mounted on said hubs of said preselection rollers, and being rotatable with respect thereto.

13. A mechanical preselection counter according to claim 1, which includes a releasing lever, and a switch contact which cooperates with said releasing lever, said releasing rack being spring-loaded by said releasing lever.

14. A mechanical preselection counter according to claim 13, in which said releasing lever is provided with a spring tongue, and in which said releasing rack is provided with a stop which extends substantially transverse to the axis of said preselection rollers, said spring tongue of said releasing lever engaging said stop.

15. A mechanical preselection counter according to claim 14, in which said switch contact is closed in the contact position of said releasing lever on said releasing rack.

16. A mechanical preselection counter according to claim 15, in which said releasing lever is further provided with an abutment, and in which, in the contact position of said releasing lever on said releasing rack, said spring tongue of said releasing lever engages said abutment.

17. A mechanical preselection counter according to claim 16, in which said abutment of said releasing lever is formed by an arm of said releasing lever.

18. A mechanical preselection counter according to claim 16, in which said switch contact is provided with a switch tongue, and in which said spring tongue of said releasing lever engages said stop of said releasing rack under the force of said switch tongue of said switch contact.

19. A mechanical preselection counter according to claim 18, in which said releasing lever is connected with said zero-setting device in such a way that upon actuation of said zero-setting device, said releasing lever is shifted counter to the force of said switch tongue of said switch contact into its contact position with said releasing rack.

20. A mechanical preselection counter according to claim 19, in which said releasing lever and said spring tongue are made in one piece, with said releasing lever being a plate-like part molded from synthetic material.

21. A mechanical preselection counter according to claim 19, which includes an eccentric, said releasing lever being mounted on said eccentric for adjusting its position with respect to said releasing rack.

* * * * *